(12) United States Patent
Armentrout

(10) Patent No.: US 12,704,149 B2
(45) Date of Patent: Aug. 11, 2026

(54) FLEXIBLE SHOE FOR A THRUST BEARING

(71) Applicant: Curtiss-Wright Electro-Mechanical Corporation, Cheswick, PA (US)

(72) Inventor: Richard Witten Armentrout, Delmont, PA (US)

(73) Assignee: CURTISS-WRIGHT ELECTRO-MECHANICAL CORPORATION, Cheswick, PA (US)

( * ) Notice: Subject to any disclaimer, the term of this patent is extended or adjusted under 35 U.S.C. 154(b) by 31 days.

(21) Appl. No.: 18/931,856

(22) Filed: Oct. 30, 2024

(65) Prior Publication Data

US 2025/0146526 A1 May 8, 2025

Related U.S. Application Data

(60) Provisional application No. 63/596,455, filed on Nov. 6, 2023.

(51) Int. Cl.
*F16C 17/06* (2006.01)

(52) U.S. Cl.
CPC .................................... *F16C 17/06* (2013.01)

(58) Field of Classification Search
CPC ................................ F16C 17/06; F16C 33/26
See application file for complete search history.

(56) References Cited

U.S. PATENT DOCUMENTS

| | | | | |
|---|---|---|---|---|
| 3,982,796 | A * | 9/1976 | Hill | F16C 41/02 384/307 |
| 4,657,411 | A * | 4/1987 | Bath | F16C 17/06 384/303 |
| 9,599,150 | B2 * | 3/2017 | Gassmann | F16C 17/06 |
| 10,393,178 | B2 * | 8/2019 | Henssler | F16C 33/201 |
| 2010/0260451 | A1 | 10/2010 | Wilkes | |

* cited by examiner

*Primary Examiner* — James Pilkington

(74) *Attorney, Agent, or Firm* — Chrisman Gallo Tochtrop LLC

(57) ABSTRACT

A shoe for a hydrodynamic thrust bearing is arranged relative to a transverse axis, a lateral axis, and a normal axis that intersect with and are perpendicular to each other. The shoe includes a bearing surface for supporting an axial load along the normal axis; a first flexible portion extending along the transverse axis; and first and second lateral portions extending laterally from opposite sides of the first flexible portion. The first flexible portion is more flexible about the transverse axis than the first and second lateral portions.

19 Claims, 9 Drawing Sheets

100
334
330
138
114
136
124
190
118, 120
$C_p$
Z
340
232
180
230
X

FLEXIBLE SHOE FOR A THRUST BEARING

CROSS-REFERENCE TO RELATED APPLICATIONS

This application claims the benefit of U.S. provisional application Ser. No. 63/596,455 filed Nov. 6, 2023, the contents of which are incorporated by reference.

TECHNICAL FIELD

The disclosure relates to a flexible shoe for a hydrodynamic thrust bearing and more particularly, a flexible shoe that can conform (self-adapt) under various hydrodynamic pressure distributions to help maintain a substantially planar bearing surface.

BACKGROUND

A thrust bearing is a particular type of bearing that is designed to support an axial load of a rotating body (e.g., thrust collar). One specific type of thrust bearing is a hydrodynamic thrust bearing, an example of which is shown in FIG. 10. In particular, the example bearing 10 comprises a base ring 12 that defines a central opening 14 of the bearing 10 with a central axis 16. The bearing 10 further includes a plurality of arcuate-shaped shoes 20 that are tangentially arranged about and supported by the base ring 12. Each shoe 20 provides an arcuate-shaped bearing surface 26 that is substantially planar and faces away from the base ring 12.

As schematically illustrated in FIG. 11A, the thrust bearing 10 can be arranged such that the shaft 30 of a rotating element extends through the opening 14, and the bearing surface 26 of each shoe 20 faces a thrust collar 34 fixed to the shaft 30. Moreover, a thin film of pressurized fluid is provided (e.g., generated) on each bearing surface 26 to interface with the collar 34 and prevent direct contact between the collar 34 and bearing surface 26. In this manner, the thrust bearing 10 can support axial loads from the thrust collar 34 while allowing the collar 34 to rotate relative to the bearing surfaces 26 of the thrust bearing 10 with relatively low friction and material contact.

A key to minimizing friction between the bearing surfaces 26 and collar 34 is having an adequate thickness of fluid therebetween with a well-distributed pressure profile, as schematically shown in FIG. 11A. To help facilitate a well-distributed pressure profile, it is preferable that the bearing surfaces 26 maintain a substantially consistent profile during operation that is substantially planar or slightly crowned. In some examples, the shoes 20 can be pivotally coupled to the base ring 12 (as schematically illustrated in FIG. 11A) to help ensure a substantially consistent alignment of the bearing surface 26 with the collar 34. Moreover, the shoes 20 are typically rigid bodies that can resist bending caused by hydrodynamic pressures.

However, changing environmental temperatures can generate thermal gradients across the body of each shoe 20, inducing heavy distortion that causes the bearing surface 26 of each shoe 20 to assume a substantially convex shape (see FIG. 11B) or a substantially concave shape (see FIG. 11C). A substantially convex profile can lead to concentrated pressure and poor film thickness toward the center of the bearing surface 26, while a substantially concave profile can lead to pressure collapse at the center of the bearing surface 26 and contact between the collar 34 and edges of the bearing surface 26. Accordingly, described herein is a flexible shoe assembly that can minimize distortion of its bearing surface and help maintain a substantially consistent profile for the bearing surface at various temperature gradients.

SUMMARY

According to a first aspect, a shoe for a hydrodynamic thrust bearing is arranged relative to a transverse axis, a lateral axis, and a normal axis that intersect with and are perpendicular to each other. The shoe includes a bearing surface for supporting an axial load along the normal axis; a first flexible portion extending along the transverse axis; and first and second lateral portions extending laterally from opposite sides of the first flexible portion. The first flexible portion is more flexible about the transverse axis than the first and second lateral portions.

BRIEF DESCRIPTION OF THE DRAWINGS

The above and other features, examples and advantages of aspects or examples of the present disclosure are better understood when the following detailed description is read with reference to the accompanying drawings, in which.

DETAILED DESCRIPTION

Figure 1:
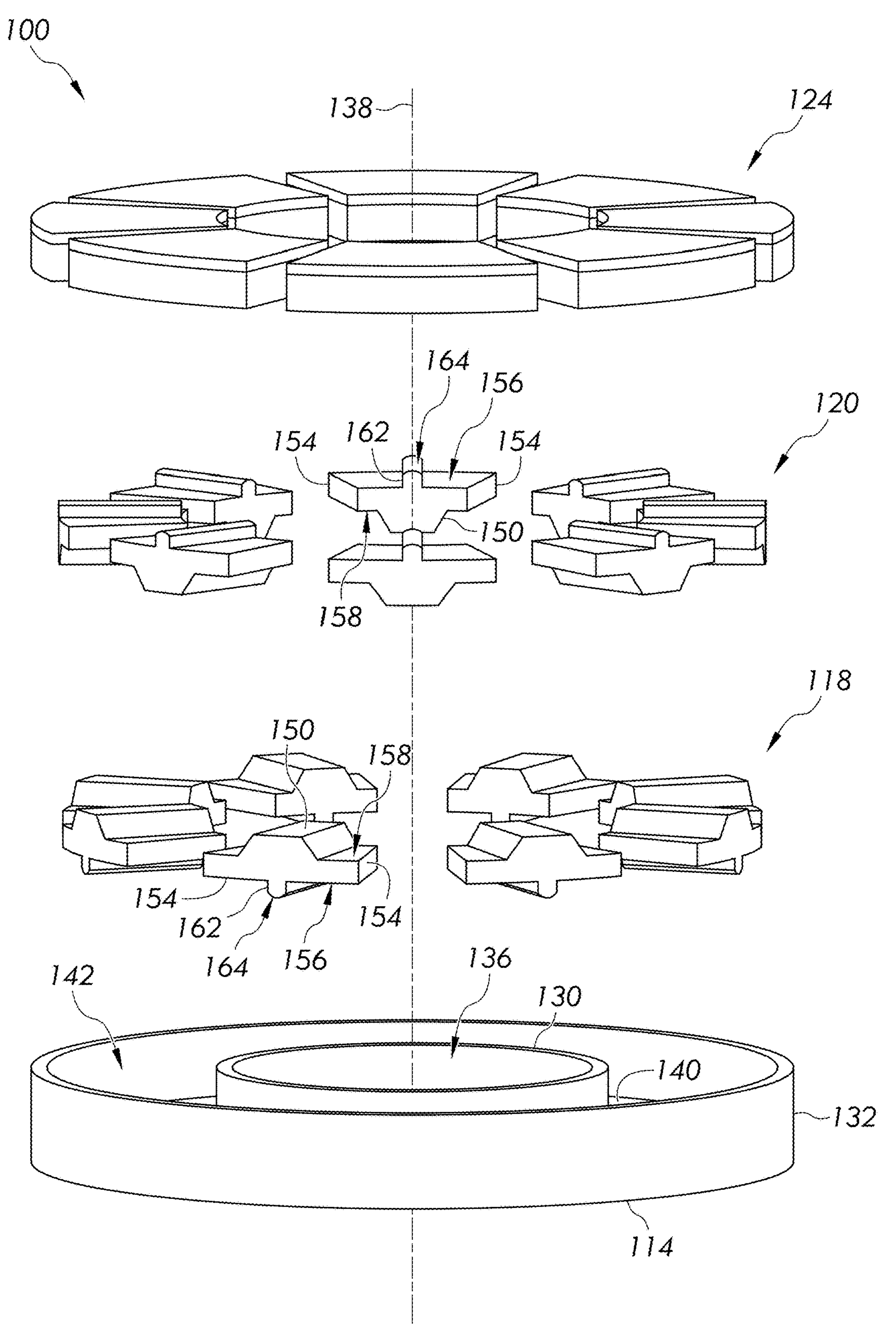
FIG. 1 is an exploded view of an example thrust bearing.

Turning to FIG. 1, an example thrust bearing 100 includes a base ring 114, a plurality of lower leveling members 118, a plurality of upper leveling members 120, and a plurality of shoe assemblies 124. In the present embodiment, the bearing 100 includes six shoe assemblies 124 and an equal number of lower and upper leveling members 118, 120 (i.e., six each). However, the number of shoe assemblies 124 and leveling members 118, 120 can vary by embodiment.

The base ring 114 provides a foundation for the leveling members 118, 120 and shoe assemblies 124 of the thrust bearing 100. The base ring 114 comprises inner and outer upstanding walls 130, 132 that are radially spaced apart and concentrically aligned. The inner wall 130 defines a central opening 136 having a central axis 138, which defines axial and radial directions for the base ring 114 and the thrust bearing 100 as a whole. Moreover, the base ring 114 includes an annular floor plate 140 that connects the inner and outer walls 130, 132 so as to form an annular channel 142 for receiving the leveling members 118, 120 and shoe assemblies 124 therein.

Each leveling member 118, 120 comprises an arcuate body having a main portion 150 and a pair of flanges 154 extending laterally from the main portion 150. The main portion 150 and flanges 154 collectively define a first arcuate surface 156 on one side of the arcuate body 144, while the main portion 150 further defines a second arcuate surface 158 on an opposite side of the arcuate body 144. Moreover, each leveling member 118, 120 further comprises a rocker portion 162 that extends from its first arcuate surface 156 and defines a convex engagement surface 164 for pivotable engagement with adjacent structure (e.g., the base ring 114 or a shoe assembly 124). In the present example, each rocker portion 162 is a rounded ridge that extends longitudinally in the radial direction, and each convex engagement surface 164 is a partial cylindrical surface. However, each rocker portion 162 may comprise other geometries providing a convex engagement surface such as, for example, a dome-shaped body having a partial spherical surface. The lower and upper leveling members 118, 120 are circumferentially arranged within the channel 142 of the base ring 114 in an alternating manner with the upper leveling members 120 being inverted relative to the lower leveling members 118. In particular, each lower leveling member 118 is arranged such that its first arcuate surface 156 and rocker portion 162 face the annular floor plate 140 of the base ring 114, and the convex engagement surface 164 of its rocker portion 162 pivotally engages the annular floor plate 140 of the base ring 114. Moreover, each upper leveling member 120 is arranged such that its first arcuate surface 156 and rocker portion 162 face an associated shoe assembly 124, while its flanges 154 overlap and engage the flanges 154 of its adjacent lower leveling members 118.

As arranged, the lower and upper leveling members 118, 120 will be tiltably mounted within the base ring 114. In particular, the lower leveling members 118 can tilt relative to the base ring 114 via the pivotal engagement of their rocker portions 162 with the annular floor plate 140, and the upper leveling members 120 will move in turn with the lower leveling members 118. In some examples, the lower and/or upper leveling members 118, 120 can further be locked into the base ring 114 using, for example, associated set screws, which can be threadably inserted through a wall of the base ring 114 and into associated bore holes or channels in the lower and/or upper leveling members 118, 120 to prevent axial or circumferential movement of the leveling members 118, 120 but still permit pivotable movement of the leveling members 118, 120 relative to the base ring 114.

It is to be appreciated that the shape, number, and configuration of the leveling members 118, 120 can vary by embodiment. For instance, in some examples, each leveling member 118, 120 may simply comprise a plate-like body with a rocker portion protruding from one or both sides. Moreover, in some examples, the bearing 100 may comprise a single row of leveling members circumferentially arranged within the base ring 114. The bearing 100 may not even include leveling members in some examples. In such examples, each shoe assembly 124 may rest directly on and engage the annular floor plate 140 of the base ring 114. The bearing 100 may comprise any configuration of leveling members without departing from the scope of the disclosure.

Figure 2:
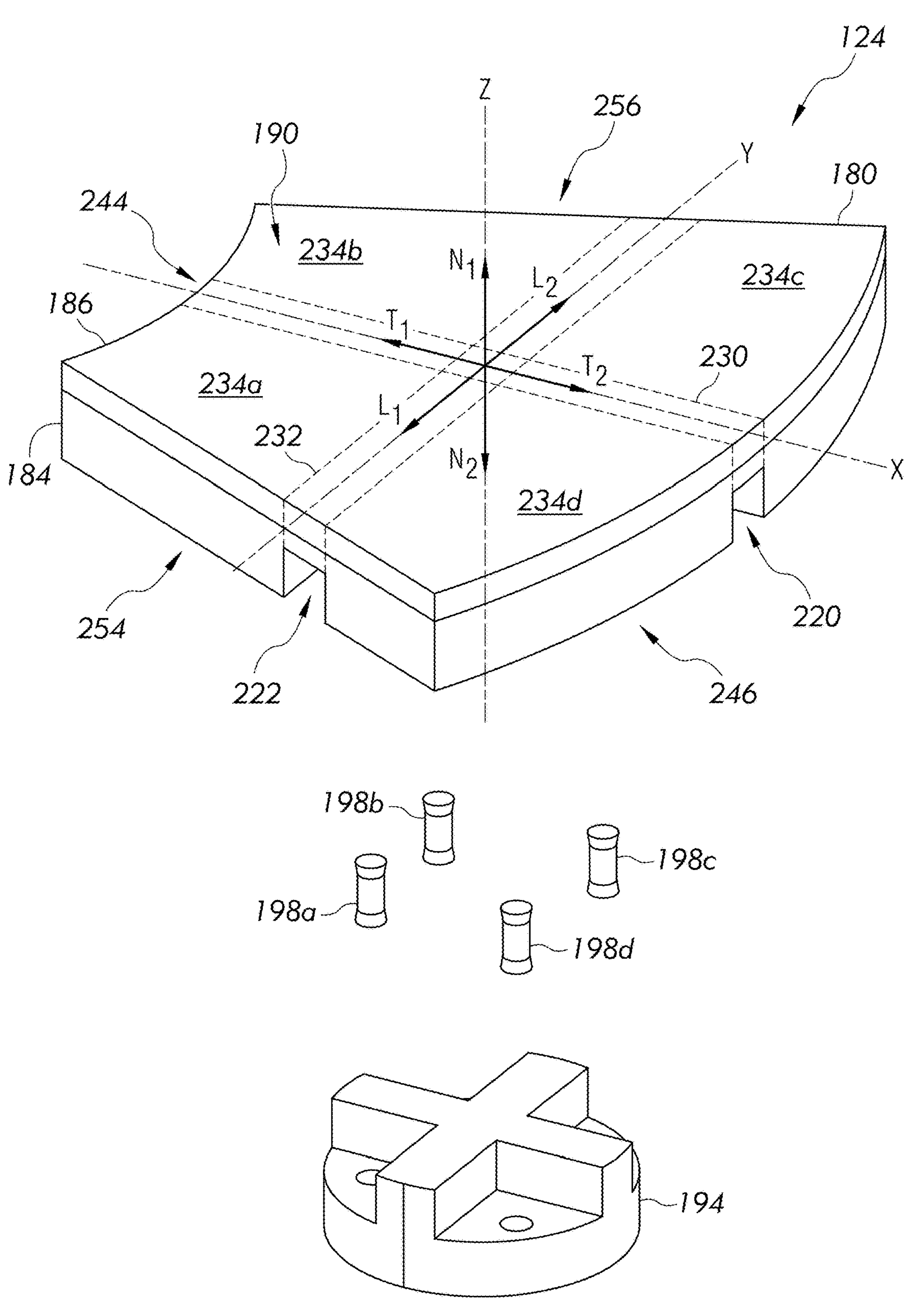
FIG. 2 is an exploded view of a shoe assembly of the thrust bearing.

Turning to FIG. 2, each shoe assembly 124 is arranged relative to an associated set of orthogonal axes including a transverse axis X, a lateral axis Y, and a normal axis Z, wherein the axes X, Y, Z all intersect with and are perpendicular to each other. The transverse, lateral, and normal axes X, Y, Z respectively define transverse, lateral, and normal directions for the shoe assembly 124. In particular, the transverse axis X defines first and second transverse directions $T_1$, $T_2$ that respectively correspond to inner and outer directions for the shoe assembly 124, and the lateral axis Y defines first and second lateral directions $L_1$, $L_2$ that respectively correspond to left and right directions for the shoe assembly 124. Moreover, the normal axis Z defines first and second normal directions $N_1$, $N_2$ that respectively correspond to upper and lower directions for shoe assembly 124. However, it is to be appreciated that directional terms such as "left", "right", "inner", "outer", "upper", "lower", and the like as used herein are not intended to imply an absolute orientation, but rather are used for ease of discussion and to explain the relative arrangement of various features.

Each shoe assembly 124 comprises a shoe 180 having a support body (e.g., a structural holder) 184 and a bearing element 186 (e.g., wear insert) coupled to the support body 184, wherein the bearing element 186 defines an arcuate bearing surface 190 for supporting the axial load of a rotating body along the normal axis Z. Moreover, each shoe assembly 124 further comprises a shoe support 194 and a plurality of pins **198*a-d* for pivotably coupling the shoe 180 to the shoe support 194**.

The bearing element 186 in the present embodiment is a plate-like body that defines the arcuate bearing surface 190. Moreover, the bearing element 186 is configured such that the arcuate bearing surface 190 will assume a reference profile when the bearing element 186 is at uniform temperature (e.g., 25° C.). In some examples, the reference profile can be a substantially planar profile that extends along a primary reference plane defined by (i.e., coincident with) the transverse axis X and lateral axis Y (for the purposes of the disclosure, a bearing surface or profile is "substantially planar" along a primary reference plane if a maximum deviation of the surface/profile from the primary reference plane is 0.0762 mm or less (0.003 inches or less), and still more preferably 0.0254 mm or less (0.001 inches or less)). In other examples, the reference profile can be slightly crowned (e.g., convex) such that the bearing surface 190 has a radius of curvature that is from 127 meters (5,000 inches) to 508 meters (20,000 inches).

However, the bearing element 186 may comprise other non-plate shapes, and the reference profile of the bearing surface 190 may have other shapes when at uniform temperature without departing from the scope of the disclosure. Broadly speaking, the bearing element 186 can be any element that defines a bearing surface for supporting an axial load along the normal axis Z, wherein the bearing surface assumes a reference profile when the shoe 180 is at uniform temperature.

Figure 3:
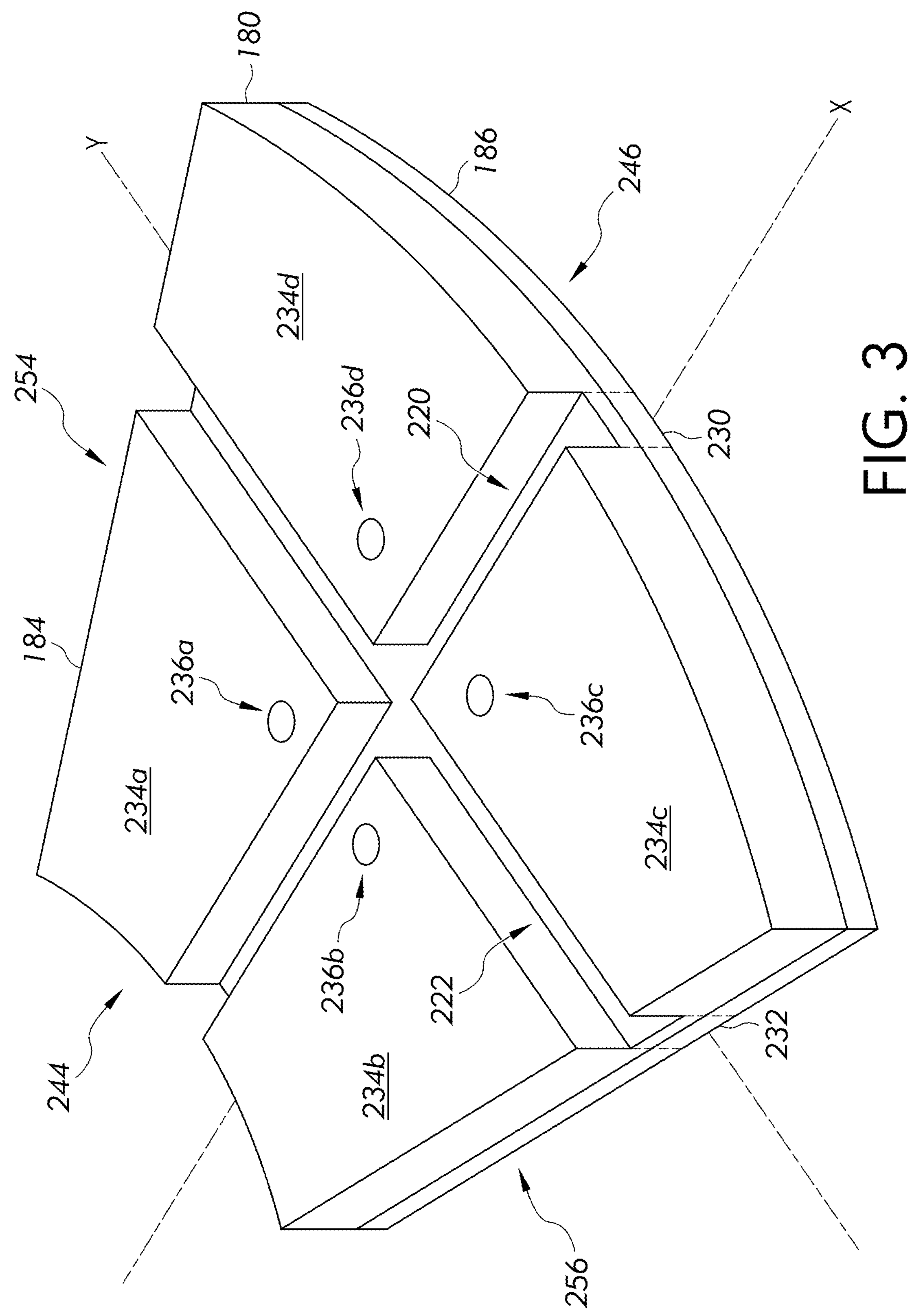
FIG. 3 is a lower perspective view of a shoe of the shoe assembly.

The support body 184 of the shoe 180 is generally thicker than the bearing element 186, and is coupled to the underside of the bearing element 186 in order to add rigidity to the shoe 180. However, as shown best in FIG. 3, the underside of the support body 184 has a plurality of channels 220, 222 formed therein that mechanically weaken the support body 184 along the transverse and lateral axes X, Y such that the shoe 180 can remain flexible about those axes X, Y. In particular, the support body 184 defines a transverse channel 220 that extends longitudinally along (i.e., substantially parallel to) the transverse axis X, and a lateral channel 222 that extends longitudinally along the lateral axis Y. In this example, the transverse channel 220 is directly under the transverse axis X, while the lateral channel 222 is directly under the lateral axis Y.

As configured, the shoe 180 has a first flexible portion 230 that extends longitudinally along and coincides with the transverse axis X, and a second flexible portion 232 that extends longitudinally along and coincides with the lateral axis Y. The shoe 180 further has a plurality of stiffening portions 234*a-d* that are demarcated (i.e., separated and delimited) by the first and second flexible portions 230, 232, wherein each stiffening portion 234*a-d* has a greater thickness (measured along the normal axis Z) than the first and second flexible portions 230, 232. In particular, the shoe 180 has an inner-left stiffening portion 234*a*, an inner-right stiffening portion 234*b*, and an outer-right stiffening portion 234*c*, and an outer-left stiffening portion 234*d*. Moreover, each stiffening portion 234*a-d* defines an associated blind hole 236*a-d* that, as discussed further below, can accommodate an associated pin 198*a-d* for pivotably coupling the shoe 180 to the shoe support 194.

The inner stiffening portions 234*a*, 234*b* and an inner segment of the first flexible portion 230 collectively form an inner transverse portion 244 of the shoe 180 that extends transversely inward from the second flexible portion 232. Moreover, the outer stiffening portions 234*c*, 234*d* and an outer segment of the first flexible portion 230 collectively form an outer transverse portion 246 of the shoe 180 that extends transversely outward from the second flexible portion 232. Meanwhile, the left stiffening portions 234*a*, 234*d* and a left segment of the second flexible portion 232 collectively form a left lateral portion 254 of the shoe 180 that extends laterally leftward from the first flexible portion 230. Moreover, the right stiffening portions 234*b*, 234*c* and a right segment of the second flexible portion 232 collectively form a right lateral portion 256 of the shoe 180 that extends laterally rightward from the first flexible portion 230.

The flexural rigidity of the shoe 180 varies at different cross-sections of the shoe 180 and the axis about which each cross-section experiences a bending moment. More specifically, the flexural rigidity of a cross-section about a given axis (e.g., the transverse axis X or lateral axis Y) is a product of the material's Young's modulus E and the cross-section's second moment of area I about that axis. Thus, cross-sections with a relatively small Young's modulus E and second moment of area I about a given axis are less rigid (i.e., more flexible) than cross-sections with relatively large Young's modulus E and second moment of area I about the given axis. Moreover, a cross-section's second moment of area I about a given axis is a function of its thickness/height (measured perpendicular to the given axis), such that the second moment of area I increases with thickness/height.

In the present example, the respective Young's moduli E for the support body 184 and bearing element 186 of the shoe 180 are generally consistent throughout the shoe 180. However, the thickness of the support body 184 (measured along the normal axis Z) varies at different locations. In particular, each stiffening portion 234*a-d* has a greater thickness than the first and second flexible portions 230, 232. Accordingly, the second moment of area I of the first flexible portion 230 about the transverse axis X is less than the second moment of area I of the left and right lateral portions 254, 256 about the transverse axis X, and the first flexible portion 230 is less rigid (i.e., more flexible) than the left and right lateral portions 254, 256 about the transverse axis X. Moreover, the second moment of area I of the second flexible portion 232 about the lateral axis Y is less than the second moment of area I of the inner and outer transverse portions 244, 246 about the lateral axis Y, and the second flexible portion 232 is less rigid (i.e., more flexible) than the inner and outer transverse portions 244, 246 about the lateral axis Y.

In other words, the reduced thickness of the shoe 180 at its first and second flexible portions 230, 232 enables the shoe 180 to be relatively flexible at those portions about the transverse and lateral axes X, Y. However, it is to be appreciated that the first and second flexible portions 230, 232 can achieve a similar relative flexibility in other manners without departing from the scope of the disclosure. For instance, the lower and/or upper side of the support body 184 may define a series of parallel channels that longitudinally extend transversely and laterally across the support body 184 along one of the axes X, Y and reduce a thickness of the shoe 180 at those channels to form a flexible portion. In other examples, the support body 184 of the shoe 180 may have a consistent thickness throughout, such that the first and second flexible portions 230, 232 are equal in thickness to the stiffening portions 234*a-d* of the shoe 180. In such examples, the support body 184 may comprise a material at the first and second flexible portions 230, 232 that has a smaller Young's modulus E than a material of the support body 184 at the stiffening portions 234*a-d*, such that the first and second flexible portions 230, 232 are more flexible than the stiffening portions 234*a-d* of the shoe 180.

Furthermore, it is to be appreciated that the shoe 180 may comprise additional or fewer flexible portions and stiffening portions without departing from the scope of the disclosure. For instance, in one example, the shoe 180 may comprise a single flexible portion (e.g., the first flexible portion 230) and two stiffening portions (e.g., the left and right lateral portions 254, 256) that are demarcated by and extend from opposite sides of the flexible portion, such that the shoe 180 only has relative flexibility about a single axis (e.g., the transverse axis X). Generally speaking, the shoe 180 can comprise any configuration having one or more flexible portions and a plurality of stiffening portions demarcated by the one or more flexible portions, wherein each flexible portion extends longitudinally along an axis and is more flexible about that axis than adjacent portions extending in opposite directions from the flexible portion.

The bearing element 186 of the shoe 180 preferably comprises a material that is softer than the material of the rotating body that is thrusted upon the bearing surface 190 during operation, which can help minimize friction in the event that the bearing surface 190 directly contacts the rotating body. For instance, a common material of rotating bodies is steel, and therefore the bearing element 186 in the present example comprises carbon graphite (which has a Young's modulus that is about 20% that of steel). However, softer materials having a relatively low Young's modulus E (low rigidity) can leave the bearing element 186 by itself too flexible to properly support the hydrodynamic pressures of the pressurized fluid provided thereupon during operation. For this reason, the support body 184 is situated at the underside of the bearing element 186 to add rigidity to the shoe 180 (while maintaining flexibility at the first and second flexible portions 230, 232). Moreover, the support body 184 preferably comprises a material that has a higher Young's modulus E than the material of the bearing element 186. For instance, the support body 184 in the present example comprises stainless steel, which has a Young's modulus E that is about 5 times higher than the Young's modulus E of the bearing element 186. However, it is to be appreciated that the materials of the support body 184 and bearing element 186 and their relative moduli can vary by embodiment without departing from the scope of the disclosure. Moreover, in some examples, the support body 184 may be formed integrally with the bearing element 186, such that both portions are formed by a single body of a single material.

Figure 4:
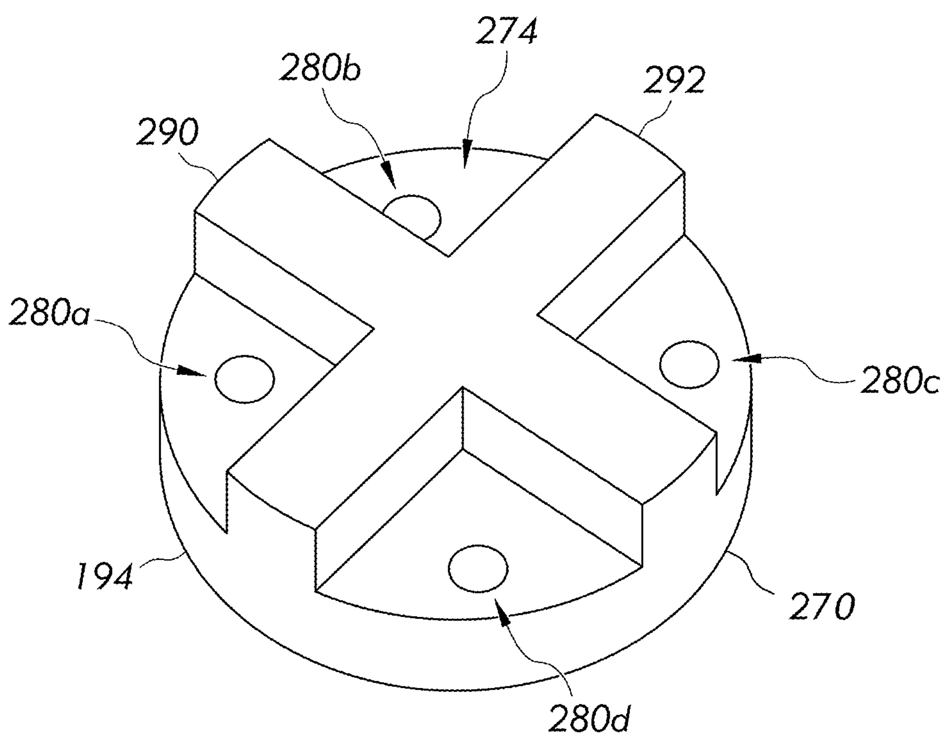
FIG. 4 is an upper perspective view of a shoe support of the shoe assembly.
Figure 5:
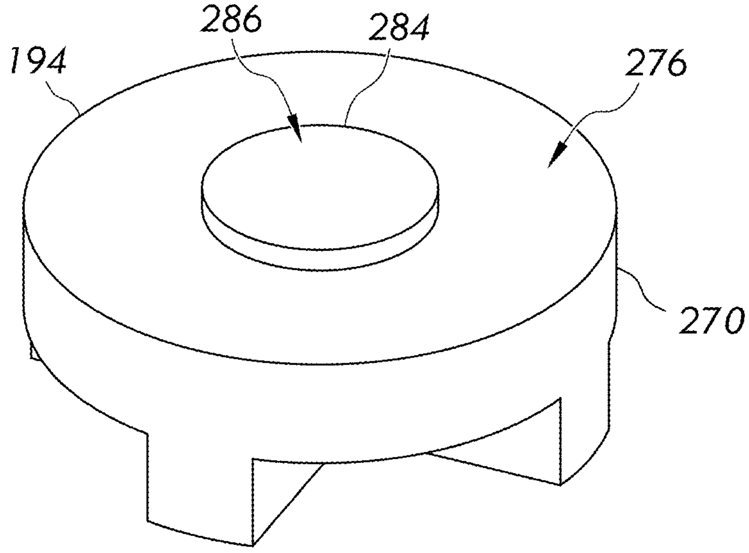
FIG. 5 is a lower perspective view of the shoe support.

Turning to FIGS. 4 and 5, the shoe support 194 of each shoe assembly 124 will now be described in further detail. The shoe support 194 comprises a main body 270 having an upper surface 274 that will face the shoe 180, and an opposing lower surface 276 that will face away from the shoe 180 and toward the annular floor plate 140 of the base ring 114. The upper surface 274 of the shoe support 194 defines a plurality of blind holes 280*a-d* that, as discussed further below, can accommodate the pins 198*a-d* of the shoe assembly 124 for pivotably coupling the shoe 180 to the shoe support 194. Moreover, the shoe support 194 further comprises a rocker portion 284 that extends downward from its lower surface 276 and defines a convex engagement surface 286 for pivotable engagement with adjacent structure (e.g., the base ring 114 or a leveling member 118, 120). In the present example, the rocker portion 284 is a projection having a dome-shaped end that defines a partial spherical engagement surface. However, the rocker portion 284 may comprise other geometries providing a convex engagement surface such as a rounded ridge.

Optionally, the shoe support 194 can further comprise one or more positioning members 290, 292 that extend upward from its upper surface 274 and can be received within the channels 220, 222 of the shoe 180 to facilitate positioning and coupling of the shoe support 194 to the shoe 180. In the present example, the shoe support 194 includes first and second positioning members 290, 292 corresponding to first and second elongated ribs that extend perpendicular to and intersect with each other. When assembling the shoe assembly 124, the shoe support 194 can be arranged relative to the shoe 180 such that the first positioning member 290 extends longitudinally along and directly below the transverse X axis of the shoe 180, and the second positioning member 292 extends longitudinally along and directly below the lateral axis Y of the shoe 180. The shoe 180 and shoe support 194 can then be assembled such that the first and second positioning members 290, 292 of the shoe support 194 are respectively received within the transverse and lateral channels 220, 222 of the shoe 180.

In this manner, the first and second positioning members 290, 292 can help ensure that the shoe support 194 is properly positioned relative to the shoe 180 along the transverse and lateral axes X, Y during assembly of shoe assembly 124 and operation of the thrust bearing 100. In particular, the first positioning member 290 can inhibit relative movement between the shoe 180 and shoe support 194 along the lateral axis Y, and the second positioning member 292 can inhibit relative movement between the shoe 180 and shoe support 194 along the transverse axis X.

It is preferable that each positioning member 290, 292 has a width and thickness that are respectively similar to the width and depth of its associated channel 220, 222 to help ensure proper positioning of the shoe support 194 relative to the shoe 180. However, it is also preferable that the widths and thicknesses of the positioning members 290, 292 are somewhat less than the widths and depths of the channels 220, 222 so the shoe 180 can flex relative to the shoe support 194 without interference from the positioning members 290, 292. To this end, it is preferable that the width of each positioning member 290, 292 (measured perpendicular to its elongated direction and parallel to the upper surface 274) is 90-95% the width of its associated channel 220, 222 (measured perpendicular to its elongated direction and parallel to the bearing surface 190). Moreover, it is preferable that the thickness of each positioning member 290, 292 (measured normal to the upper surface 274) is 50-75% the depth of its associated channel 220, 222 (measured along the normal axis Z).

Figure 6:
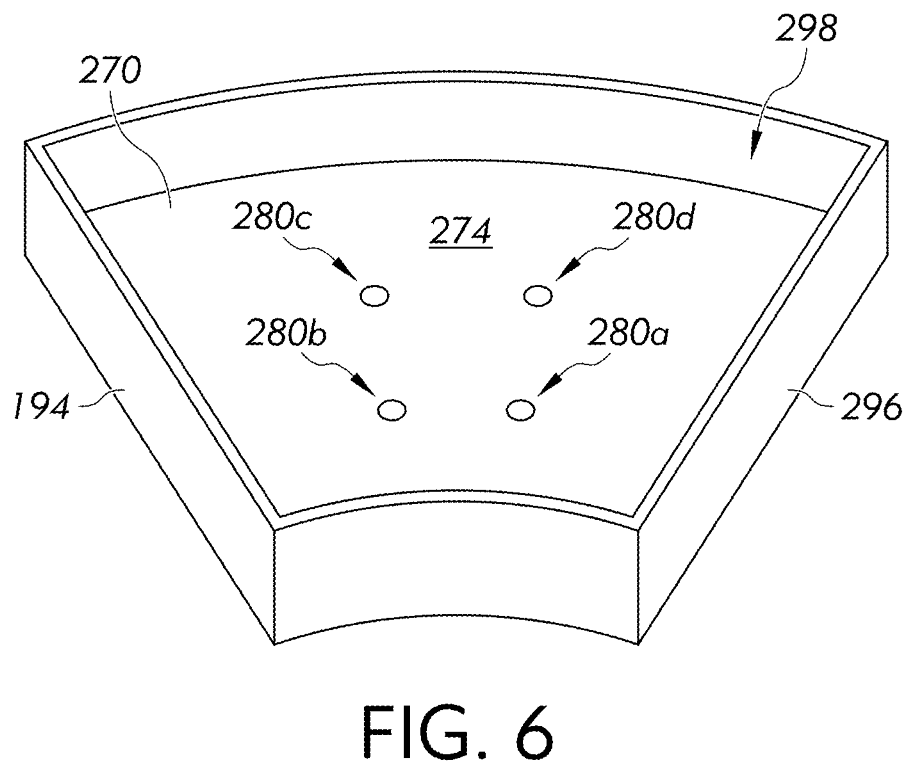
FIG. 6 is an upper perspective view of an alternative embodiment of the shoe support.
Figure 7:
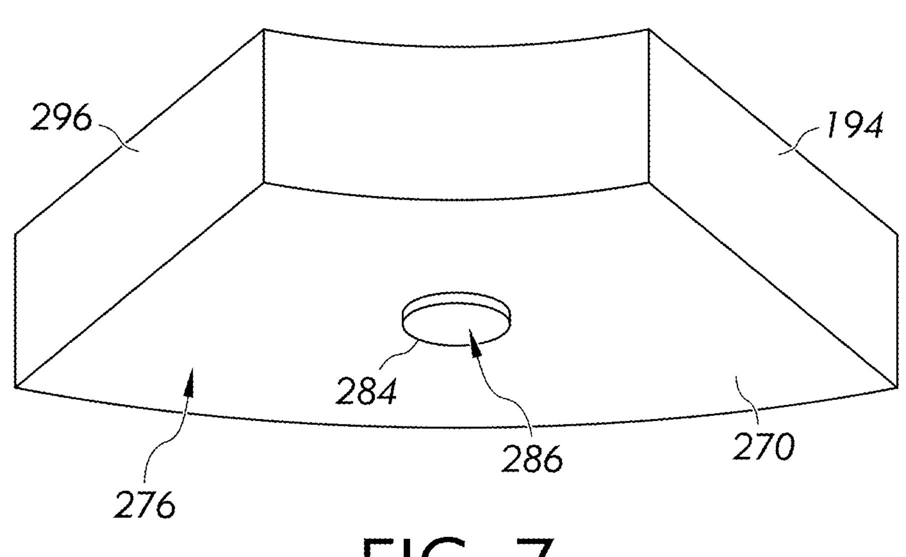
FIG. 7 is a lower perspective view of the alternative embodiment of the shoe support.

As noted above, the positioning members 290, 292 in the present example correspond to first and second elongated ribs. However, it is to be appreciated that shoe support 194 can comprise any number and configuration of positioning members without departing from the scope of the disclosure. For instance, FIGS. 6 and 7 show an alternative example wherein the shoe support 194 has a positioning member 296 in the form of an upstanding wall that extends upward from and around an outer perimeter of the main body 270, thereby defining a cavity 298 that can receive the entire shoe 180 therein. In this example, the main body 270 and positioning member 296 have a shape that substantially matches the shape of the shoe 180 and its bearing surface 190, such that the shoe 180 will fit snugly within the cavity 298 of the shoe support 194, thereby inhibiting relative movement between the shoe 180 and shoe support 194 along the transverse and lateral axes X, Y. This embodiment of the shoe support 194 can be helpful if the support body 184 has thin channels that form the first and second flexible regions and are not wide enough to accommodate corresponding positioning ribs protruding upward from the main body 270.

Figure 8:
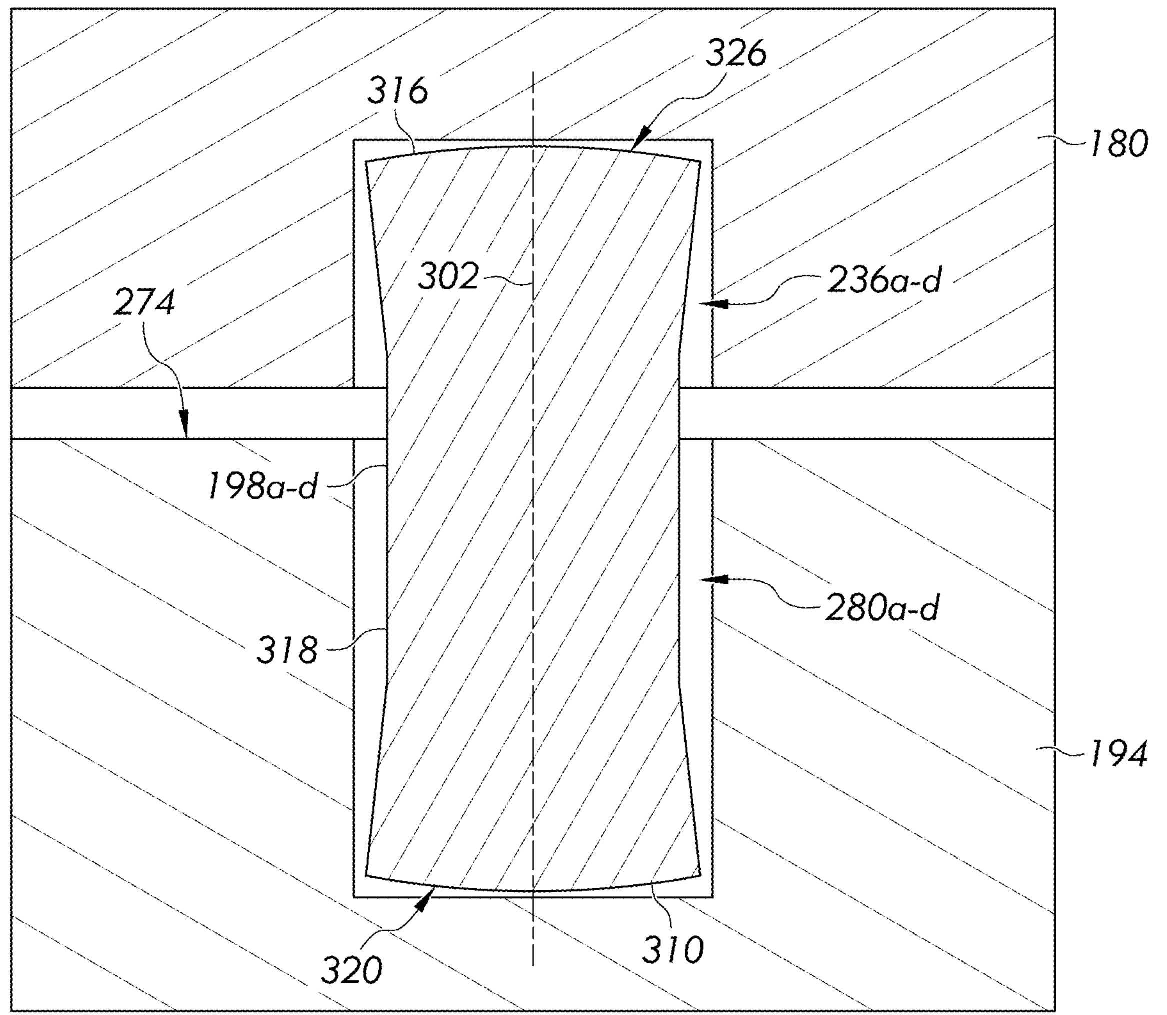
FIG. 8 is an enlarged cross-section view of the shoe assembly.

Turning to FIG. 8, each pin 198*a-d* of the shoe assembly 124 is an elongated body that extends longitudinally along a central axis 302 and comprises a lower end portion 310, an upper end portion 316, and an intermediate portion 318 extending between and connecting the lower and upper end portions 310, 316. The intermediate portion 318 is substantially cylindrical such that it has a substantially constant diameter. Meanwhile, each end portion 310, 316 is flared such that its diameter gradually increases along the central axis 302 from the intermediate portion 318 to its distal end. As such, the diameter of the intermediate portion 318 will be smaller than a maximum diameter of each end portion 310, 316.

Moreover, each end portion 310, 316 defines a convex engagement surface 320, 326 for pivotable engagement with adjacent structure (e.g., the shoe 180 or shoe support 194). In the present example, each convex engagement surface 320, 326 is a partial spherical engagement surface. However, each convex engagement surface 320, 326 may comprise other convex geometries without departing from the scope of the disclosure.

When assembling the shoe assembly 124, each pin 198*a-d* can be arranged such that its lower end portion 310 is received with an associated blind hole 280*a-d* of the shoe support 194, and its upper end portion 316 is received with an associated blind hole 236*a-d* of the shoe 180. Moreover, the convex engagement surfaces 320, 326 of the pin 198*a-d* will pivotally engage the floors of their associated holes 280*a-d*, 236*a-d*, which are substantially flat. In this manner, the shoe support 194 and shoe 180 can be pivotally coupled, since the shoe support 194 and shoe 180 can respectively pivot about the convex engagement surfaces 320, 326 of the pins 198*a-d*.

It is preferable that the end portions 320, 326 of each pin 198*a-d* each have a maximum diameter that is similar the diameter of its associated hole 280*a-d*, 236*a-d* to help ensure proper positioning of each pin 198*a-d* relative to the shoe 180 and shoe support 194. However, it is also preferable that there is sufficient clearance between the end portions 320, 326 and the sides of their associated holes 280*a-d*, 236*a-d* to allow the shoe 180 and shoe support 194 to pivot relative to each other without the end portions 320, 326 contacting the sides of their associated holes 280*a-d*, 236*a-d* and binding the shoe 180 and shoe support 194. To this end, it is preferable that the maximum diameter of each end portion 320, 326 is 90-95% the diameter of its associated blind hole 280*a-d*, 236*a-d*.

For similar reasons, it preferable that there is a similar or greater clearance between the intermediate portion 318 of each pin 198*a-d* and its associated holes 280*a-d*, 236*a-d*, since the relative pivotable movement of the shoe 180 and shoe support 194 can be greater near the intermediate portion 318. However, the diameter of the intermediate portion 318 must also be large enough to support axial loads without becoming overstressed in compression. To this end, it is preferable that the diameter of each intermediate portion 318 is 80-90% the diameter of each associated blind hole 280*a-d*, 236*a-d*. However, it is to be appreciated that the relative diameters of the intermediate portion 318 and end portions 320. 326 for each pin 198*a-d* may vary in other examples.

The pins 198*a-d* described above thus enable the shoe support 194 and shoe 180 to be pivotally coupled such that the shoe 180 can flex without restriction from the pins 198*a-d*. In the present embodiment, the shoe assembly 124 has four stiffening portions 234*a*-234*d* demarcated by the first and second flexible portions 230, 232. Accordingly, the shoe 180 has four pins 198*a-d* that are received within four holes 236*a-d* in the shoe 180 and four holes 280*a-d* in the shoe support 194, wherein each stiffening portion 234*a*-234*d* has an associated hole 236*a-d*. However, the shoe assembly 124 may comprise other numbers and configurations of pins 198*a-d* and associated holes 280*a-d*, 236*a-d* without departing from the scope of the disclosure. Indeed, as noted above, the shoe 180 can comprise any configuration having a plurality of stiffening portions demarcated by one or more flexible portions. Preferably, the shoe 180 will define at least one hole for each stiffening portion, wherein a pin is received within that hole and an associated hole of the shoe support 194 to pivotably couple the shoe support 194 and shoe 180.

It is to be appreciated that the shoe 180 and shoe support 194 of each shoe assembly 124 can be pivotably coupled in a variety of other manners without departing from the scope of the disclosure. Moreover, in some examples, the shoe 180 and shoe support 194 may be fixed to each other, such that the shoe 180 and shoe support 194 do not pivotally engage each other. Still further, in some examples, the shoe support 194 can be integrally formed with the support body 184 of the shoe 180. Broadly speaking, each shoe assembly 124 can comprise any configuration having a shoe with a bearing surface and a flexible portion, and a separate or integrally-formed shoe support that is coupled to the shoe and defines a convex engagement surface for pivotable engagement with adjacent structure.

As shown in FIG. 1, the shoe assemblies 124 can be circumferentially aligned and received within the annular channel 142 of the base ring 114, as shown in FIG. 1. In particular, the shoe assemblies 124 can be arranged such that their transverse axes X are radially aligned relative to the central axis 138 of the base ring 114, and the rocker portion 284 of each shoe assembly 124 extends downward and pivotably engages an associated upper leveling member 120 (or the floor 140 of the base ring 114).

Figure 9:
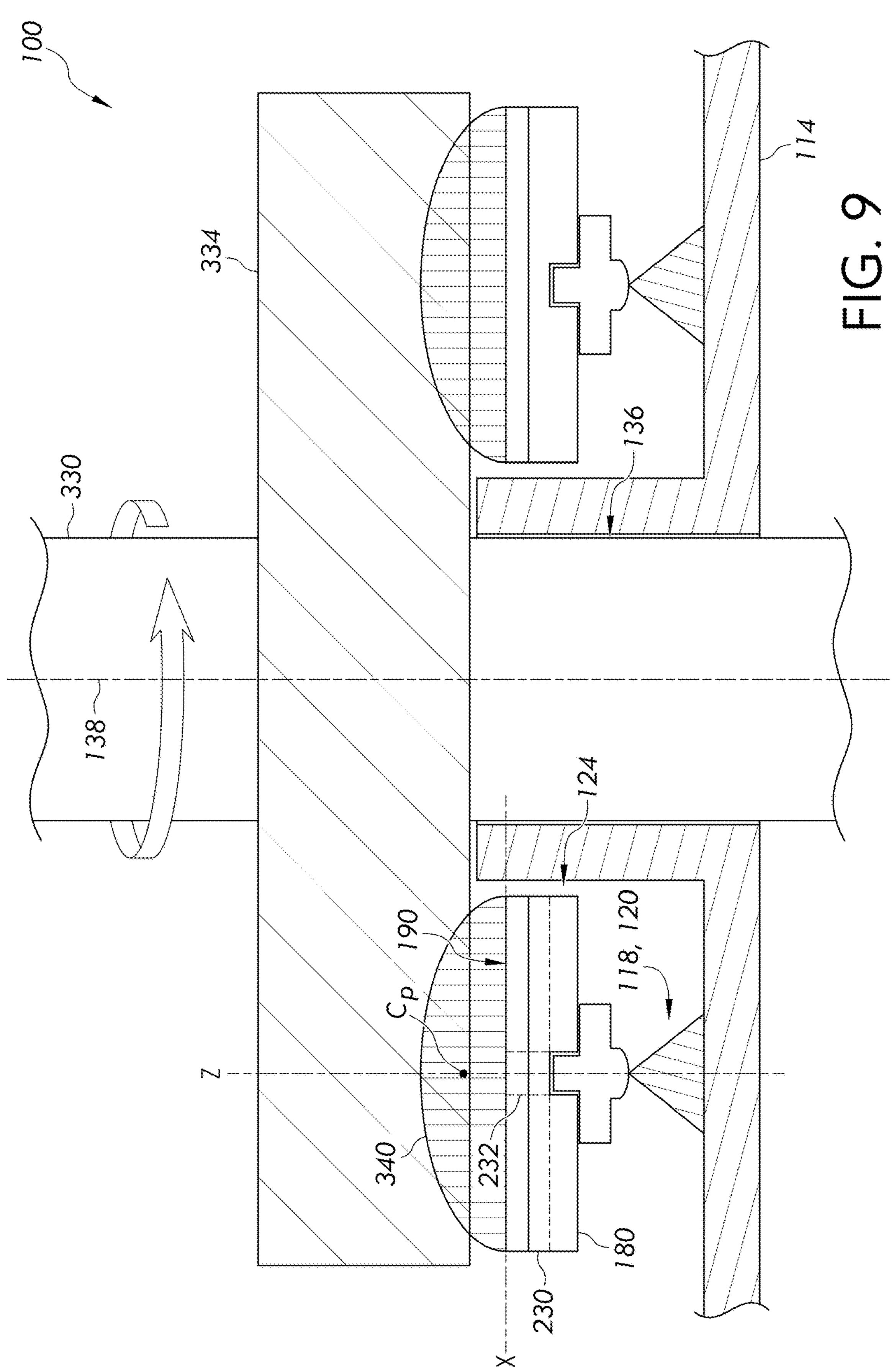
FIG. 9 is a schematic cross-section view of the thrust bearing and a rotating body.
Figure 10:
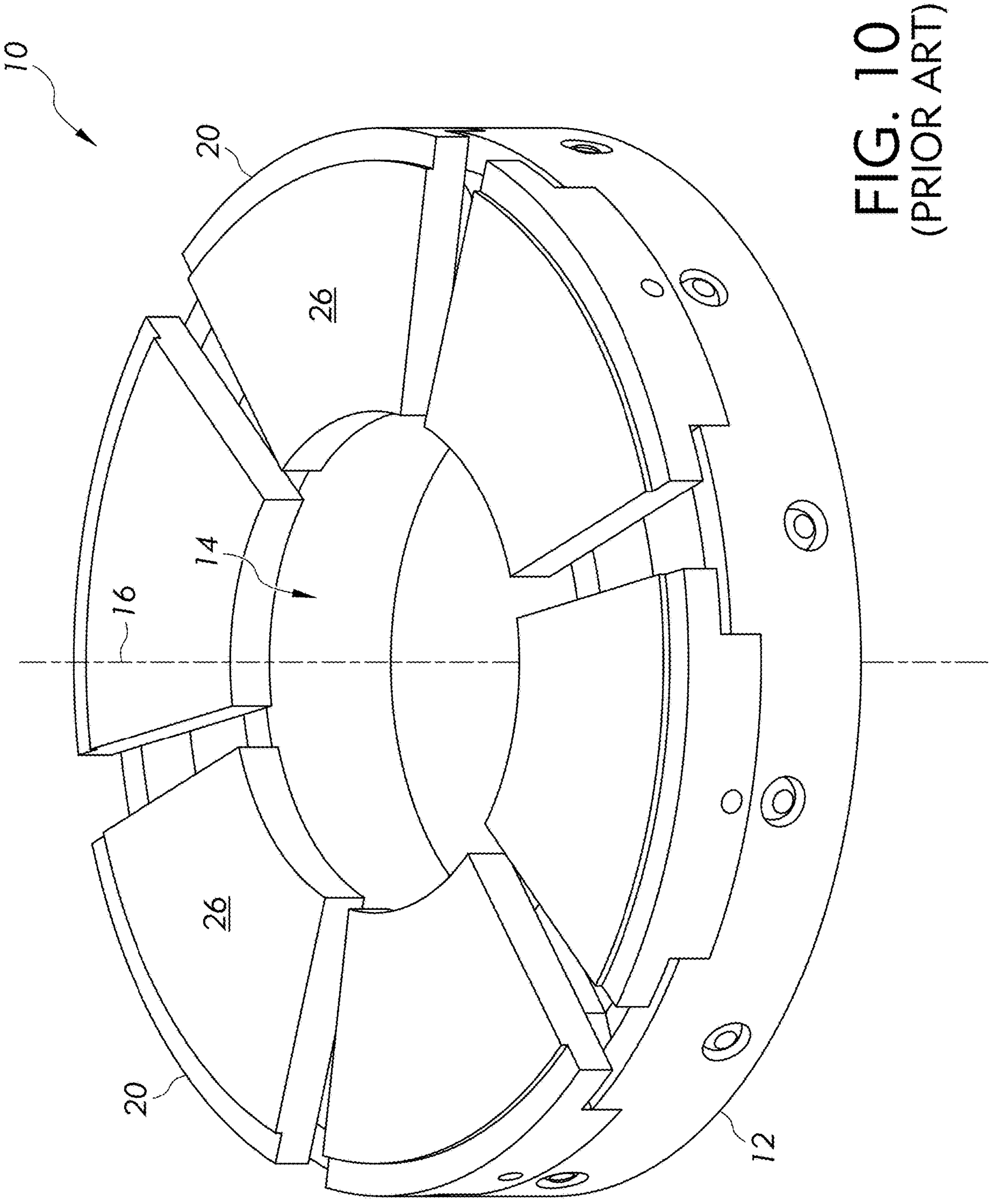
FIG. 10 is a perspective view of a conventional thrust bearing.

As shown schematically in FIG. 9, the thrust bearing 100 can then be arranged such that the shaft 330 of a rotating element extends through the opening 136 of the bearing 100, and the bearing surface 190 of each shoe assembly 124 faces a thrust collar 334 fixed to the shaft 330. Moreover, a thin film of pressurized fluid 340 can be applied (e.g., developed) on each bearing surface 190 to interface with the collar 334 and prevent direct contact between the collar 334 and bearing surface 190.

Notably, the film of pressurized fluid 340 on each bearing surface 190 will have a centroid of hydrodynamic pressure, as represented by reference $c_p$ in FIG. 9. The ultimate location of the fluid's centroid of hydrodynamic pressure $c_p$ can depend on various factors such as, for example, the shape of the bearing surface 190 and the rotational speed of the rotating element. In the present embodiment, each shoe assembly 124 has a shoe support 194 with a partial spherical engagement surface 286 for pivotable engagement with adjacent structure (e.g., the base ring 114 or a leveling member 118, 120), thereby enabling each shoe assembly 124 to pivot freely about its transverse and lateral axes X, Y during operation. Moreover, because each shoe assembly 124 can pivot freely about its transverse and lateral axes X, Y, the centroid of hydrodynamic pressure $c_p$ will by first principles be located in alignment with the pivot point of the shoe assembly 124. In particular, the normal axis Z will pass through the centroid of hydrodynamic pressure $c_p$, the center of curvature for the partial spherical engagement surface 286, and the point of contact between the engagement surface 286 and the adjacent structure below (e.g., the base ring 114 or a leveling member 118, 120). Moreover, the normal axis Z will preferably pass through the centroid of hydrodynamic pressure $c_p$ and the intersection of the first and second flexible portions 230, 232 However, one or more of these features (e.g., the centroid of hydrodynamic pressure $c_p$, the center of curvature for the partial spherical engagement surface 286, the first flexible portion 230, and/or the second flexible portion 232) may be offset from the normal axis Z in some examples.

Figure 11A:
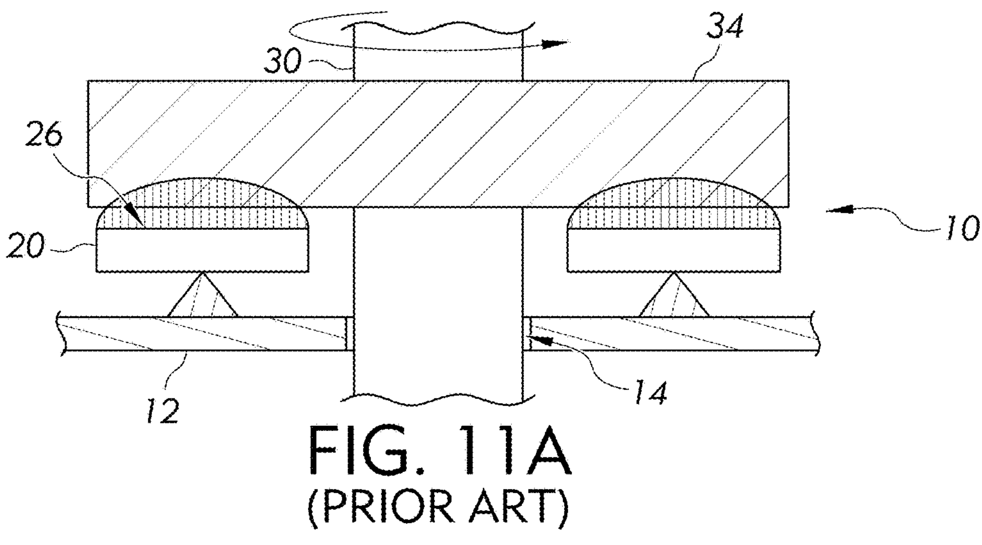
FIG. 11A is a schematic cross-section view of the conventional thrust bearing and a rotating body, wherein a bearing surface of the thrust bearing is substantially flat.

As discussed further above with reference to a conventional thrust bearing 10 shown in FIGS. 10 and 11A-C, a key to minimizing friction between the bearing surfaces of a hydrodynamic thrust bearing and a rotating body is having an adequate thickness of fluid therebetween with a well-distributed pressure profile, as schematically shown in FIG. 11A. To help facilitate a well-distributed pressure profile, it is preferable that each bearing surface maintains a substantially consistent profile during operation that is substantially planar or slightly crowned. However, thermal gradients across a conventional shoe body can induce distortion in the shoe that causes its bearing surface to assume a substantially convex shape (see FIG. 11B) or a substantially concave shape (see FIG. 11C).

Figure 11B:
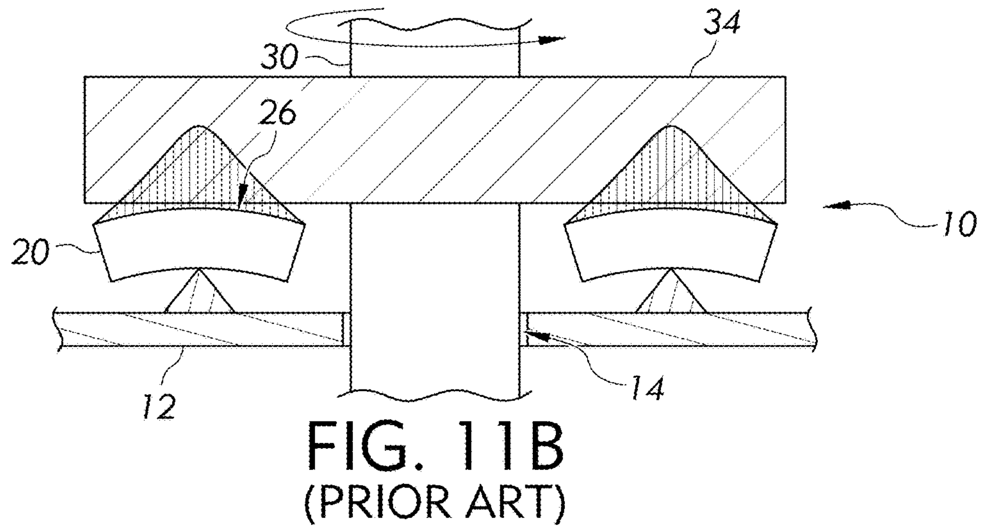
FIG. 11B is a schematic cross-section view of the conventional thrust bearing and rotating body, wherein the bearing surface of the thrust bearing is substantially convex.

Accordingly, the example thrust bearing 100 of the present disclosure can help minimize distortion and maintain a substantially consistent profile for the bearing surfaces 190 at various temperature gradients. More specifically, as noted above, each bearing surface 190 is configured to assume a reference profile when its associated shoe 180 is at uniform temperature (e.g., 25° C.). If a shoe 180 experiences a thermal gradient across its body that begins to induce convex distortion in its bearing surface 190, hydrodynamic pressure will begin to concentrate toward the center of the bearing surface 190, similar to as shown in FIG. 11B. However, because each shoe 180 has flexible portions 230, 232 that are relatively flexible about the shoe's transverse and lateral axes X, Y and aligned on the normal axis Z with the fluid's centroid of hydrodynamic pressure $c_p$, such concentration of hydrodynamic pressure toward the center of the bearing surface 190 will cause the bearing surface 190 to flatten and oppose a convex profile, such that the bearing surface 190 maintains its reference profile.

Figure 11C:
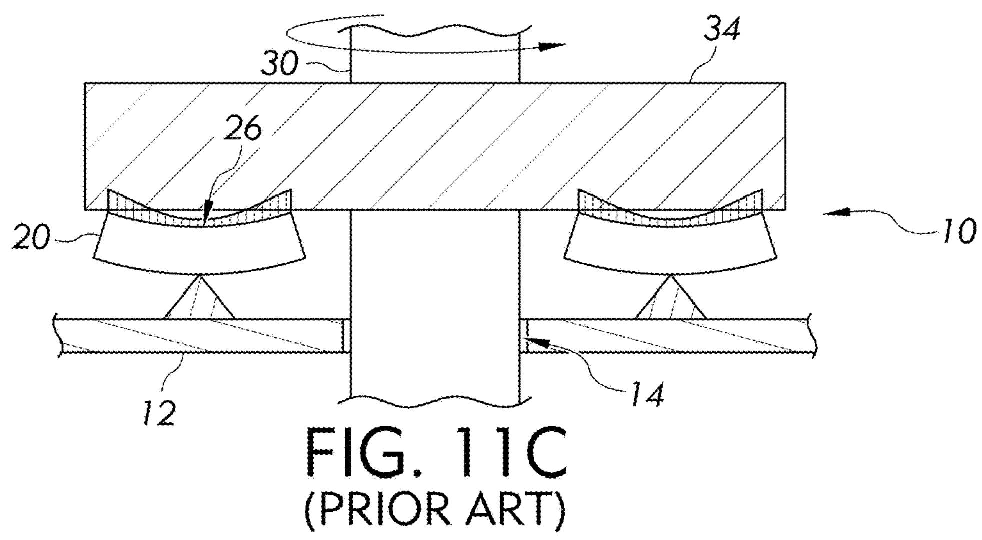
FIG. 11C is a schematic cross-section view of the conventional thrust bearing and rotating body, wherein the bearing surface of the thrust bearing is substantially concave.

Conversely, if the shoe 180 experiences a thermal gradient across its body that begins to induce concave distortion in its bearing surface 190, hydrodynamic pressure will begin to concentrate toward the edges of the bearing surface 190, similar to as shown in FIG. 11C. However, such concentration of hydrodynamic pressure at the edges of the bearing surface 190 will likewise cause the bearing surface 190 to flatten and oppose a concave profile, such that the bearing surface 190 maintains its reference profile.

The invention has been described with reference to example embodiments. Modifications and alterations will occur to others upon reading and understanding the preceding detailed description. It is intended that the exemplary embodiments be construed as including all such modifications and alterations insofar as they come within the scope of the appended claims or the equivalents thereof.

What is claimed is:

1. A shoe for a hydrodynamic thrust bearing, the shoe being arranged relative to a transverse axis, a lateral axis, and a normal axis that intersect with and are perpendicular to each other, the shoe comprising:

a bearing surface for supporting an axial load along the normal axis;

a first flexible portion extending along the transverse axis;

a second flexible portion extending along the lateral axis;

a first lateral portion extending laterally from a first side of the first flexible portion;

a second lateral portion extending laterally from a second side of the first flexible portion that is opposite to the first side of the first flexible portion;

a first transverse portion extending transversely from a first side of the second flexible portion, the first transverse portion including a segment of the first lateral portion and a segment of the second lateral portion; and a second transverse portion extending transversely from a second side of the second flexible portion that is opposite to the first side of the second flexible portion, the second transverse portion including another segment of the first lateral portion and another segment of the second lateral portion, wherein the first flexible portion is more flexible about the transverse axis than the first and second lateral portions, and wherein the second flexible portion is more flexible about the lateral axis than the first and second transverse portions.

2. The shoe according to claim 1, wherein the first and second lateral portions each comprise one or more stiffening portions, each stiffening portion having a thickness that is greater than a thickness of the first flexible portion.

3. The shoe according to claim 1, wherein the first flexible portion and first and second lateral portions define a channel that extends longitudinally along the transverse axis.

4. The shoe according to claim 1, wherein the shoe comprises a plurality of stiffening portions demarcated by the first and second flexible portions, each stiffening portion having a thickness that is greater than a thickness of the first flexible portion and a thickness of the second flexible portion.

5. The shoe according to claim 1, wherein:

the first flexible portion and first and second lateral portions define a transverse channel that extends longitudinally along the transverse axis, and the second flexible portion and first and second transverse portions define a lateral channel that extends longitudinally along the lateral axis.

6. A shoe assembly comprising:

a shoe according to claim 1, and a shoe support coupled to the shoe that supports the shoe and defines a convex engagement surface for pivotable engagement with another structure.

7. The shoe assembly according to claim 6, wherein the normal axis passes through the first flexible portion and a center of curvature of the convex engagement surface.

8. The shoe assembly according to claim 6, wherein the normal axis passes through the first flexible portion, the second flexible portion, and a center of curvature of the convex engagement surface.

9. The shoe assembly according to claim 6, further comprising one or more pins pivotably coupling the shoe and shoe support, wherein each pin is received within an associated hole in the shoe and an associated hole in the shoe support.

10. The shoe assembly according to claim 9, wherein each pin comprises:

a first end portion defining a first convex pin surface for pivotably engaging the shoe, a second end portion defining a second convex pin surface for pivotably engaging the shoe support, and an intermediate portion between and connecting the first end portion and second end portion.

11. The shoe assembly according to claim 10, wherein the first end portion and second end portion are radially flared such that a diameter of the intermediate portion is less than a maximum diameter of the first end portion and a maximum diameter of the second end portion.

12. The shoe assembly according to claim 9, wherein the shoe comprises a plurality of stiffening portions demarcated by the first flexible portion and the second flexible portion, wherein each pin is received within a hole of an associated stiffening portion.

13. A hydrodynamic thrust bearing comprising:

a base ring, and a plurality of shoe assemblies circumferentially aligned about and supported by the base ring, wherein each shoe assembly of the plurality of shoe assemblies corresponds to the shoe assembly according to claim 6.

14. A system comprising:

a hydrodynamic thrust bearing according to claim 13;

a rotatable body comprising a shaft and a thrust collar fixed to the shaft, wherein the bearing surface of each shoe assembly of the plurality of shoe assemblies faces the thrust collar; and a layer of pressurized fluid provided on the bearing surface of each shoe assembly of the plurality of shoe assemblies.

15. The system according to claim 14, wherein for each shoe assembly of the plurality of shoe assemblies, the layer of pressurized fluid provided on the bearing surface of the shoe assembly has a centroid of hydrodynamic pressure located such that the normal axis passes through the centroid of hydrodynamic pressure and the first flexible portion of the shoe assembly.

16. The system according to claim 15, wherein for each shoe assembly of the plurality of shoe assemblies, the normal axis of the shoe assembly passes through the second flexible portion.

17. A shoe assembly comprising:

a shoe for a hydrodynamic thrust bearing, the shoe being arranged relative to a transverse axis, a lateral axis, and a normal axis that intersect with and are perpendicular to each other, the shoe comprising:

a bearing surface for supporting an axial load along the normal axis, a first flexible portion extending along the transverse axis, a second flexible portion extending along the lateral axis, and a first lateral portion extending laterally from a first side of the first flexible portion, wherein the first flexible portion is more flexible about the transverse axis than the first and second lateral portions;

a shoe support coupled to the shoe that supports the shoe and defines a convex engagement surface for pivotable engagement with another structure, wherein the shoe support comprises:

a main body having a first surface that faces the shoe and an opposing second surface that faces away from the shoe, one or more positioning members extending from the first surface of the main body, each positioning member being configured for inhibiting relative movement between the shoe and shoe support along the lateral axis and/or transverse axis, and a rocker portion that extends from the second surface of the main body and defines the convex engagement surface.

18. The shoe assembly according to claim 17, wherein:

the first flexible portion and first and second lateral portions define a transverse channel that extends longitudinally along the transverse axis, and the one or more positioning members includes a first positioning member that is received within the transverse channel and configured for inhibiting relative movement between the shoe and shoe support along the lateral axis.

19. The shoe assembly according to claim 18, wherein:

the shoe defines a lateral channel that extends longitudinally along the lateral axis, and the one or more positioning members includes a second positioning member that is received within the lateral channel and configured for inhibiting relative movement between the shoe and shoe support along the transverse axis.

* * * * *